United States Patent
Chen

[19]

[11] Patent Number: 5,910,193
[45] Date of Patent: Jun. 8, 1999

[54] ADJUSTABLE BRAKE LEVER ASSEMBLY

[75] Inventor: Zen Ming Chen, Chang Hua Hsien, Taiwan

[73] Assignee: Tektro Technology Corporation, Chang Hua, Taiwan

[21] Appl. No.: 08/910,133

[22] Filed: Aug. 13, 1997

[51] Int. Cl.[6] .................... G05G 11/00; G05G 1/04; F16C 1/10; F16C 1/22
[52] U.S. Cl. .................... 74/489; 74/502.2; 74/502.6; 74/522
[58] Field of Search .................... 74/489, 502.2, 74/502.6, 522, 526

[56] References Cited

U.S. PATENT DOCUMENTS

| | | | |
|---|---|---|---|
| 5,448,927 | 9/1995 | Lumpkin | 74/489 X |
| 5,515,743 | 5/1996 | Lumpkin | 74/489 X |
| 5,564,311 | 10/1996 | Chen | 74/489 |
| 5,660,082 | 8/1997 | Hsieh | 74/489 X |
| 5,669,268 | 9/1997 | Tsai | 74/489 |
| 5,778,729 | 7/1998 | Tsai | 74/489 |
| 5,819,589 | 10/1998 | Nakashima et al. | 74/516 X |

*Primary Examiner*—Charles A. Marmor
*Assistant Examiner*—Brandon C. Stallman

[57] ABSTRACT

A brake lever device includes a handle having a lever pivotally coupled to the base. The lever includes a groove and two or more notches communicating with the groove. A cable coupler includes a rod slidably engaged in the groove and to be engaged with either of the notches. A post is rotatably engaged in the lever and has a notch for allowing the rod to be moved to engage with the other notch when the notch is faced toward the notches. The rod may be stably retained in the notches when the notch of the post is faced away from the notches.

5 Claims, 3 Drawing Sheets

ADJUSTABLE BRAKE LEVER ASSEMBLY

BACKGROUND OF THE INVENTION

1. Field of the Invention

The present invention relates to a brake lever, and more particularly to an adjustable brake lever.

2. Description of the Prior Art

Typical brake levers comprise a lever pivotally coupled to a base for actuating a brake cable. The levers each includes a cavity for engaging with one end of the brake cable. However, the levers each includes a particular configuration for engaging with a predetermined sized hand and may not be adjusted to accommodate various sized hands.

The present invention has arisen to mitigate and/or obviate the afore-described disadvantages of the conventional brake levers.

SUMMARY OF THE INVENTION

The primary objective of the present invention is to provide an adjustable brake lever assembly which may be adjusted for accommodating various sized hands.

In accordance with one aspect of the invention, there is provided a brake lever assembly comprising a base, a handle including a lever pivotally coupled to the base at a pivot shaft, for allowing the handle and the lever to be rotated about the pivot shaft, the lever including a groove and at least two notches communicating with the groove, a coupler including a rod slidably engaged in the groove of the lever and adapted to be engaged with either of the at least two notches, for securing a cable to the lever, and a post rotatably engaged in the lever and engaged through the groove, the post including a notch adapted to be faced toward and away from the notches. The rod may be stably retained in the notches when the notch of the post is faced away from the notches, and the rod is allowed to move into the groove and to move to engage with the other notch when the notch of the post is faced toward the notches, for allowing the handle to be adjusted to different moment of force.

The post includes a neck, the lever includes a pin engaged in the lever and engaged with the neck for rotatably securing the post to the lever and for allowing the post to be rotated relative to the lever.

A positioning means is further provided for positioning the post relative to the lever. The positioning means includes a spring engaged between the bolt and the lever for resiliently positioning the post in place. The post includes a knob extended outward of the lever, the spring is engaged between the knob and the lever for biasing the knob outward of the lever.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
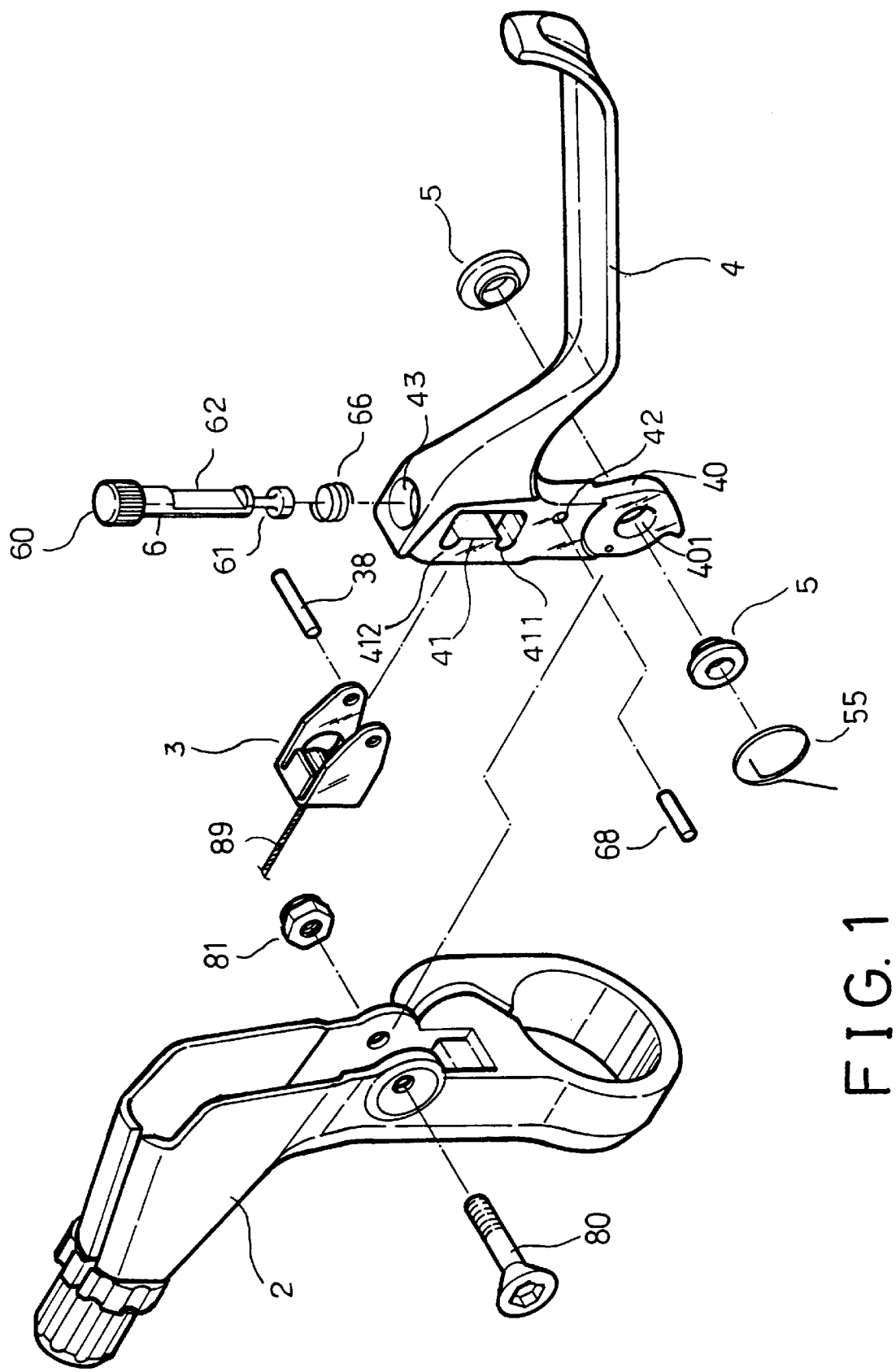
FIG. 1 is an exploded view of a brake lever assembly in accordance with the present invention.
Figure 2:
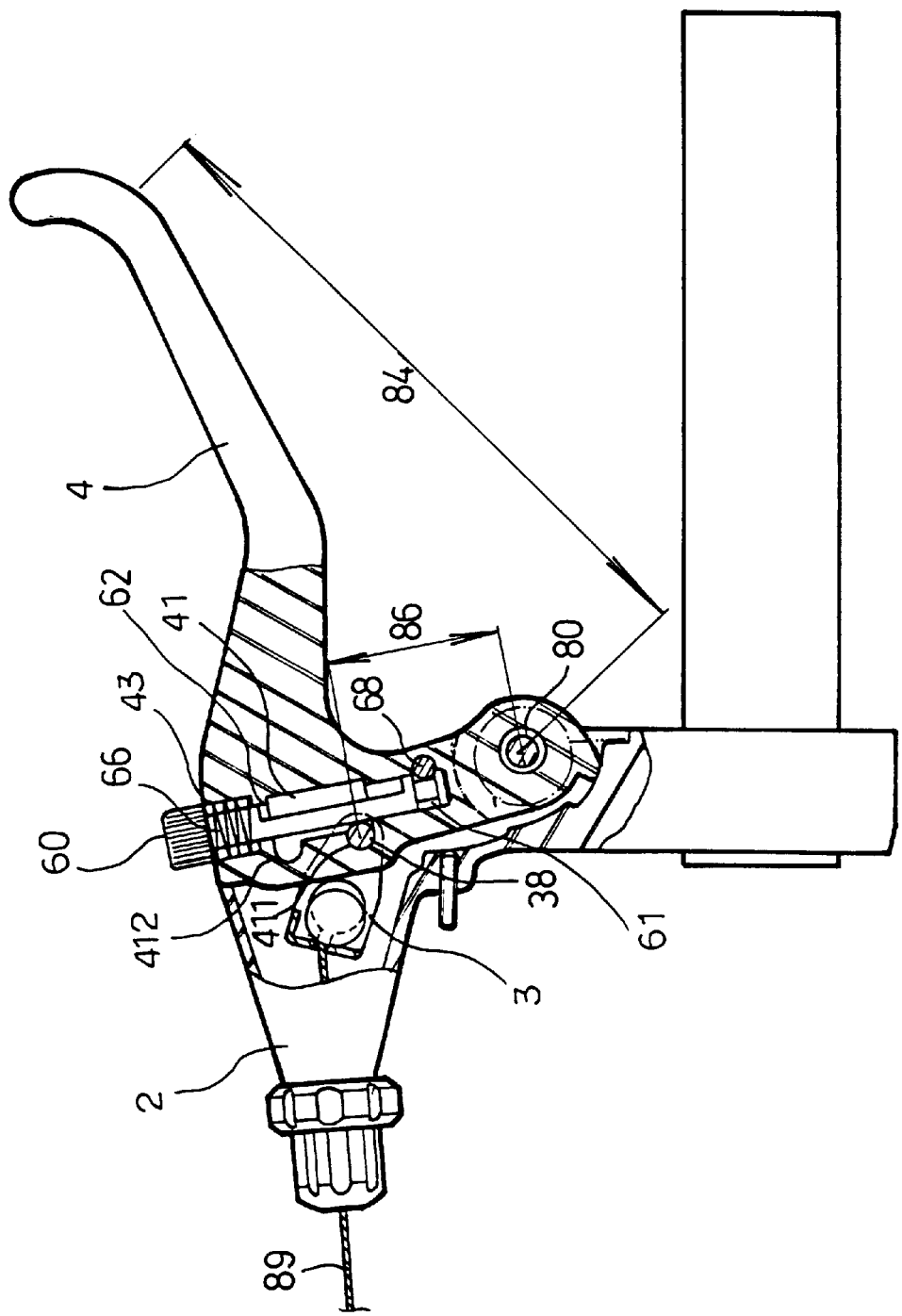
FIGS. 2 and 3 are cross sectional views showing the operation of the brake lever assembly.
Figures 3, 4:
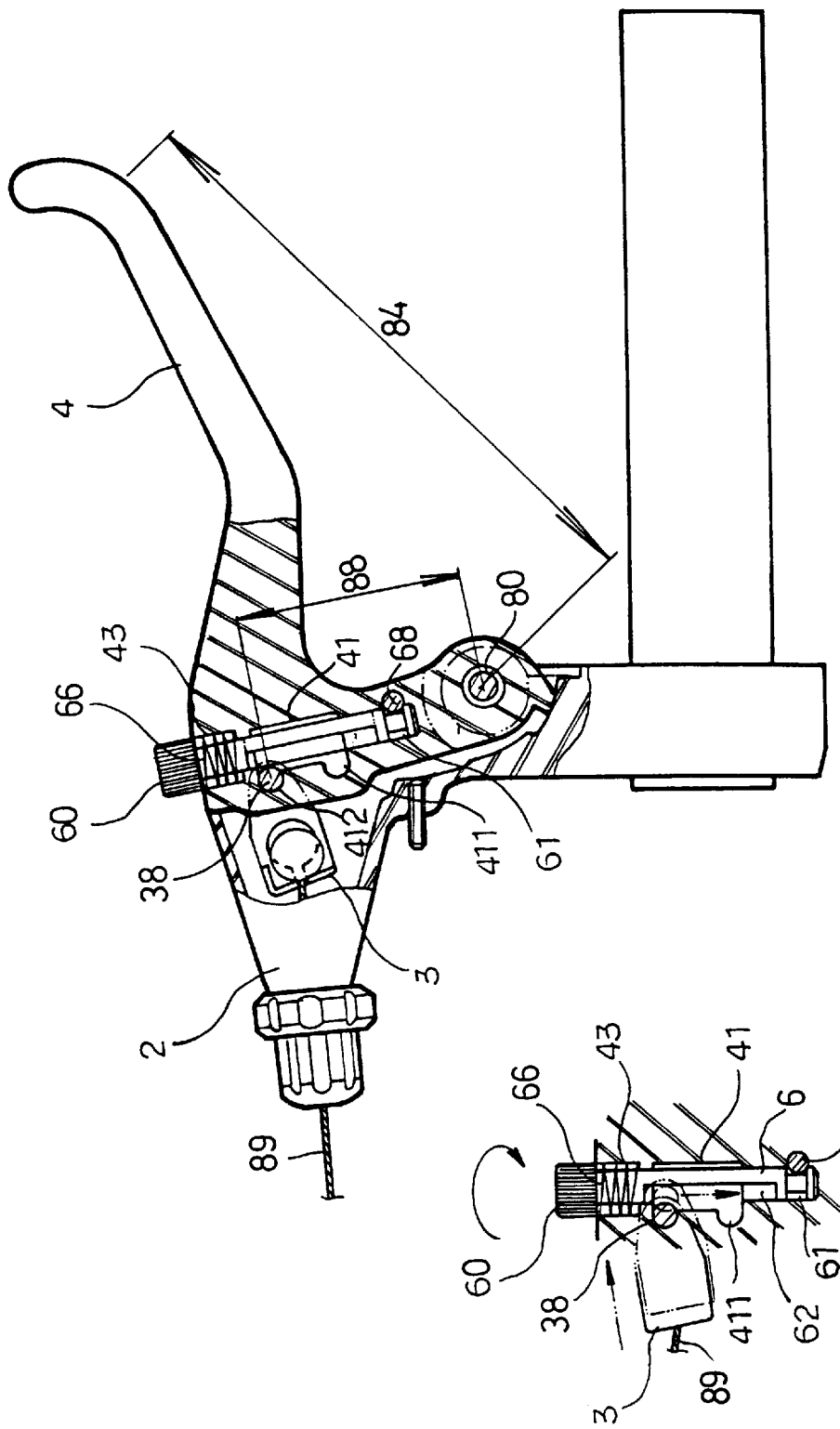
FIG. 4 is a schematic view illustrating the operation of the adjustable brake lever assembly.

Referring to the drawings, and initially to FIGS. 1 and 2, an adjustable brake lever assembly in accordance with the present invention comprises a base 2, and a handle 4 having an angularly disposed lever 40. The lever 40 includes an orifice 401 formed in one end for pivotally coupled to the base 2 by a bolt 80 and a nut 81. The bolt 80 forms the pivot shaft for the handle 4 and for allowing the handle 4 to be rotated relative to the base 2 about the pivot shaft 80. Two gaskets 5 are engaged between the bolt 80 and the lever 40. A spring 55 is engaged on the bolt 80 and engaged with the lever 40 for biasing the lever 40 toward and to engage with the base 2. The lever 40 includes a groove 41 extended along the longitudinal direction of the lever 40 and includes two recesses 411, 412 communicating with the lower portion and the upper portion of the groove 41 respectively (FIGS. 1–4). The lever 40 includes a hole 43 also extended along the longitudinal direction of the lever 40 and communicating with the groove 41 and having a length longer than that of the groove 41 (FIGS. 2–4).

A brake cable 89 has one end secured to a coupler 3 which includes a rod 38 slidably engaged in the groove 41 for engaging with either of the recesses 411, 412 and for securing the brake cable 89 to the lever 40. A post 6 is rotatably engaged in the hole 43 and includes a neck 61 formed in the bottom portion and includes a notch 62 formed in the middle portion and engaged in the groove 41. A pin 68 is engaged in a hole 42 of the lever 40 and engaged with the neck 61 of the post 6 for rotatably securing the post 6 in the hole 43. The post 6 includes a knob 60 formed on top and extended upward beyond the lever 40 for allowing the user to rotate the post 6 with the knob 60. A spring 66 is engaged between the knob 60 and the lever 40 for resiliently positioning the post 6 in place.

Referring again to FIG. 2, when the notch 62 of the post 6 is faced away from the notches 411, 412, the rod 38 may be stably retained in either of the notches 411, 412 by the post 6. When the rod 38 is engaged with the notch 411, the rod 38 is located closer to the pivot shaft 80 and has a smaller moment of force 86. The lever of force 84 is constant. However, as shown in FIGS. 3 and 4, when the post 6 is rotated for facing the notch 62 toward the notches 411, 412, the rod 38 is allowed to move into the groove 41 and to move to engage with the other notch 412. At this moment, the moment of force 88 is greater than that 86 of the assembly as shown in FIG. 2. The rod 38 may be retained in place in the notch 412 when the post 6 is rotated to disengage the notch 62 from the rod 38, such that the adjustable brake lever assembly may be easily adjusted to accommodate various sized hands. The spring 66 may position the post 6 in place.

The lever 40 may provide two or more notches 411, 412 communicating with the groove 41 for allowing the brake lever assembly to be adjusted to various kinds of moments of forces.

Accordingly, the adjustable brake lever assembly in accordance with the present invention includes a lever having a groove and two notches communicating with the groove, and includes a coupler for engaging with either of the notches and for adjusting to different moment of force.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A brake lever assembly comprising:

a base, a handle including a lever pivotally coupled to said base at a pivot shaft, for allowing said handle and said lever to be rotated about said pivot shaft, said lever including a groove and at least two notches communicating with said groove, a coupler including a rod slidably engaged in said groove of said lever and adapted to be engaged with either of said at least two notches, for securing a cable to said lever, and a post rotatably engaged in said lever and engaged through said groove, said post including a notch adapted to be faced toward and away from said notches of said lever, said rod being adapted to be stably retained in said notches of said lever when said notch of said post is faced away from said notches of said lever, and said rod being allowed to move into said groove and to move to engage with the other notch when said notch of said post is faced toward said notches of said lever, for allowing said handle to be adjusted to different moment of force.

2. A brake lever assembly according to claim 1, wherein said post includes a neck, said lever includes a pin engaged in said lever and engaged with said neck for rotatably securing said post to said lever and for allowing said post to be rotated relative to said lever.

3. A brake lever assembly according to claim 1 further comprising means for positioning said post relative to said lever.

4. A brake lever assembly according to claim 3, wherein said positioning means includes a spring engaged between said post and said lever for resiliently positioning said post in place.

5. A brake lever assembly according to claim 4, wherein said post includes a knob extended outward of said lever, said spring is engaged between said knob and said lever for biasing said knob outward of said lever.

* * * * *